US012057649B2

(12) United States Patent
Alloway et al.

(10) Patent No.: US 12,057,649 B2
(45) Date of Patent: Aug. 6, 2024

(54) ELECTRICAL CONNECTOR SYSTEM

(71) Applicant: TE Connectivity Services GmbH, Schaffhausen (CH)

(72) Inventors: Michael Jerome Alloway, Winston Salem, NC (US); Madan Kumara M C, Bangalore (IN); Michael Dale Brown, Winston Salem, NC (US)

(73) Assignee: TE Connectivity Solutions GmbH (CH)

( * ) Notice: Subject to any disclaimer, the term of this patent is extended or adjusted under 35 U.S.C. 154(b) by 353 days.

(21) Appl. No.: 17/673,885

(22) Filed: Feb. 17, 2022

(65) Prior Publication Data

US 2023/0216226 A1 Jul. 6, 2023

(51) Int. Cl.
*H01R 12/71* (2011.01)
*H01R 13/502* (2006.01)
*H01R 13/629* (2006.01)

(52) U.S. Cl.
CPC ......... *H01R 12/712* (2013.01); *H01R 13/502* (2013.01); *H01R 13/62933* (2013.01); *H01R 2201/26* (2013.01)

(58) Field of Classification Search
CPC ................ H01R 12/712; H01R 13/502; H01R 13/62933; H01R 2201/26; H01R 13/518; H01R 13/62938
See application file for complete search history.

(56) References Cited

U.S. PATENT DOCUMENTS

| | | | | |
|---|---|---|---|---|
| 3,471,822 A * | 10/1969 | Van Baelen | H01R 13/514 | 439/724 |
| 3,581,268 A * | 5/1971 | Akst | H01R 31/02 | 439/507 |
| 3,950,060 A * | 4/1976 | Stipanuk | H01R 12/7029 | 439/329 |
| 4,923,405 A * | 5/1990 | Munsterman | H01R 12/58 | 439/82 |
| 5,007,156 A * | 4/1991 | Hurtgen | H02K 5/225 | 310/71 |
| 8,197,264 B1 * | 6/2012 | Eakins | H01R 12/57 | 439/83 |
| 2002/0151210 A1 * | 10/2002 | Singh | H01R 12/774 | 439/495 |
| 2012/0289070 A1 * | 11/2012 | Uchida | H01R 13/62955 | 439/157 |
| 2015/0044889 A1 * | 2/2015 | Wang | H05K 1/11 | 439/876 |
| 2017/0117642 A1 * | 4/2017 | Juanes Ribas | H02G 15/06 | |

* cited by examiner

*Primary Examiner* — Travis S Chambers

(57) ABSTRACT

A bridge connector system includes a housing having one or more chambers, one or more connectors held in the corresponding chambers, one or more bridge connectors received in the corresponding chambers and electrically connected to the corresponding connectors, and one or more harness connectors coupled to the housing and being electrically connected to the corresponding bridge connectors. The bridge connectors electrically connect the harness connectors with the connectors.

20 Claims, 8 Drawing Sheets

ELECTRICAL CONNECTOR SYSTEM

CROSS REFERENCE TO RELATED APPLICATIONS

This application claims benefit to Indian Application No. 202241000759, filed 6 Jan. 2022, the subject matter of which is herein incorporated by reference in its entirety.

BACKGROUND OF THE INVENTION

The subject matter herein relates generally to electrical connector systems.

Various electrical connectors are used in many fields and applications. For example, in automotive applications, electrical connectors are used to connect various components or systems within the vehicle. The connectors typically use various sized connectors and contacts making integration and assembly difficult. For example, wire harness connectors are typically connected to a control module of the vehicle. Different wire harness manufacturers may use different sized harness terminals or arrange the harness terminals in different locations requiring a different arrangement of board terminals on the control board of the control module. Additionally, different vehicles use different wire harnesses requiring a different arrangement of board terminals on the control board of the control module for different vehicles within a fleet of vehicles.

A need remains for a robust and simple electrical connector system.

BRIEF DESCRIPTION OF THE INVENTION

In an embodiment, a bridge connector system is provided including a housing having one or more chambers, one or more connectors held in the corresponding chambers, one or more bridge connectors received in the corresponding chambers and electrically connected to the corresponding connectors, and one or more harness connectors coupled to the housing and being electrically connected to the corresponding bridge connectors. The bridge connectors electrically connect the harness connectors with the connectors.

In one embodiment, an electrical connector assembly is provided and includes a board connector is configured to be coupled to a control circuit board of a control module. The board connector includes a board connector housing holding a plurality of board contacts. Each board contact includes a mating end and a terminating end. The terminating end is configured to be coupled to the control circuit board. The mating end includes a receptacle. The electrical connector assembly includes a bridge connector coupled to the board connector. The bridge connector is configured to be coupled to a harness connector. The bridge connector includes a bridge holder includes terminal channels. The bridge connector includes bridge terminals received in corresponding terminal channels. Each bridge terminal includes a harness mating pin and at least one board mating pin opposite the harness mating pin. The board mating pins of the bridge terminals are received in receptacles of the corresponding board contacts. Optionally, all of the board mating pins in the bridge connector may be of a common size. Optionally, at least two of the harness mating pins in the bridge connector may be of different sizes.

In another embodiment, an electrical connector assembly is provided and includes a first board connector is configured to be coupled to a control circuit board of a control module. The first board connector includes a first board connector housing holding a plurality of first board contacts. Each first board contact includes a first mating end and a first terminating end. The first terminating end is configured to be coupled to the control circuit board. The first mating end includes a first receptacle. The first board connector has a first upper board connector interface defined by the first mating ends and a first lower board connector interface defined by the first terminating ends. The electrical connector assembly includes a second board connector is configured to be coupled to a control circuit board of a control module. The second board connector includes a second board connector housing holding a plurality of second board contacts. Each second board contact includes a second mating end and a second terminating end. The second terminating end is configured to be coupled to the control circuit board. The second mating end includes a second receptacle. The second board connector has a second upper board connector interface defined by the second mating ends identical to the first upper board connector interface and a second lower board connector interface defined by the second terminating ends identical to the first lower board connector interface. The electrical connector assembly includes a first bridge connector coupled to the first board connector. The first bridge connector is configured to be coupled to a first harness connector. The first bridge connector includes a first bridge holder includes first terminal channels. The first bridge connector includes first bridge terminals received in corresponding first terminal channels. Each first bridge terminal includes a first harness mating pin and at least one first board mating pin opposite the first harness mating pin. The first board mating pins of the first bridge terminals are received in first receptacles of the corresponding first board contacts, wherein the first bridge connector has a first upper bridge connector interface defined by the first harness mating pins and a first lower bridge connector interface defined by the first board mating pins. The electrical connector assembly includes a second bridge connector coupled to the second board connector. The second bridge connector is configured to be coupled to a second harness connector. The second bridge connector includes a second bridge holder includes second terminal channels. The second bridge connector includes second bridge terminals received in corresponding second terminal channels. Each second bridge terminal includes a second harness mating pin and at least one second board mating pin opposite the second harness mating pin. The second board mating pins of the second bridge terminals are received in second receptacles of the corresponding second board contacts. The second bridge connector has a second upper bridge connector interface defined by the second harness mating pins different from the first upper bridge connector interface and a second lower bridge connector interface defined by the second board mating pins different from the first lower bridge connector interface.

In a further embodiment, an electrical connector system is provided and includes an outer housing including a base forms an inner chamber. The outer housing includes a shroud extending from the base. The shroud forms a shroud chamber open to the inner chamber. The shroud chamber is configured to receive a harness connector. The electrical connector system includes a control circuit board received in the inner chamber. The electrical connector system includes an electrical connector assembly received in the shroud chamber and coupled to the control circuit board. The electrical connector assembly is configured to electrically connect the control circuit board and the harness connector. The electrical connector assembly includes a board connector electrically connected to the control circuit board and a bridge connector electrically connected to the board connector. The board connector includes a board connector housing holding a plurality of board contacts. Each board contact includes a mating end and a terminating end. The terminating end coupled to the control circuit board. The mating end includes a receptacle. The bridge connector includes a bridge holder includes terminal channels. The bridge connector includes bridge terminals received in corresponding terminal channels. Each bridge terminal includes a harness mating pin and at least one board mating pin opposite the harness mating pin. The harness mating pins is configured to be electrically connected to the harness connector. The board mating pins of the bridge terminals are received in receptacles of the corresponding board contacts. All of the board mating pins in the bridge connector are of a common size. At least two of the harness mating pins in the bridge connector are of different sizes.

DETAILED DESCRIPTION OF THE INVENTION

Figure 1:
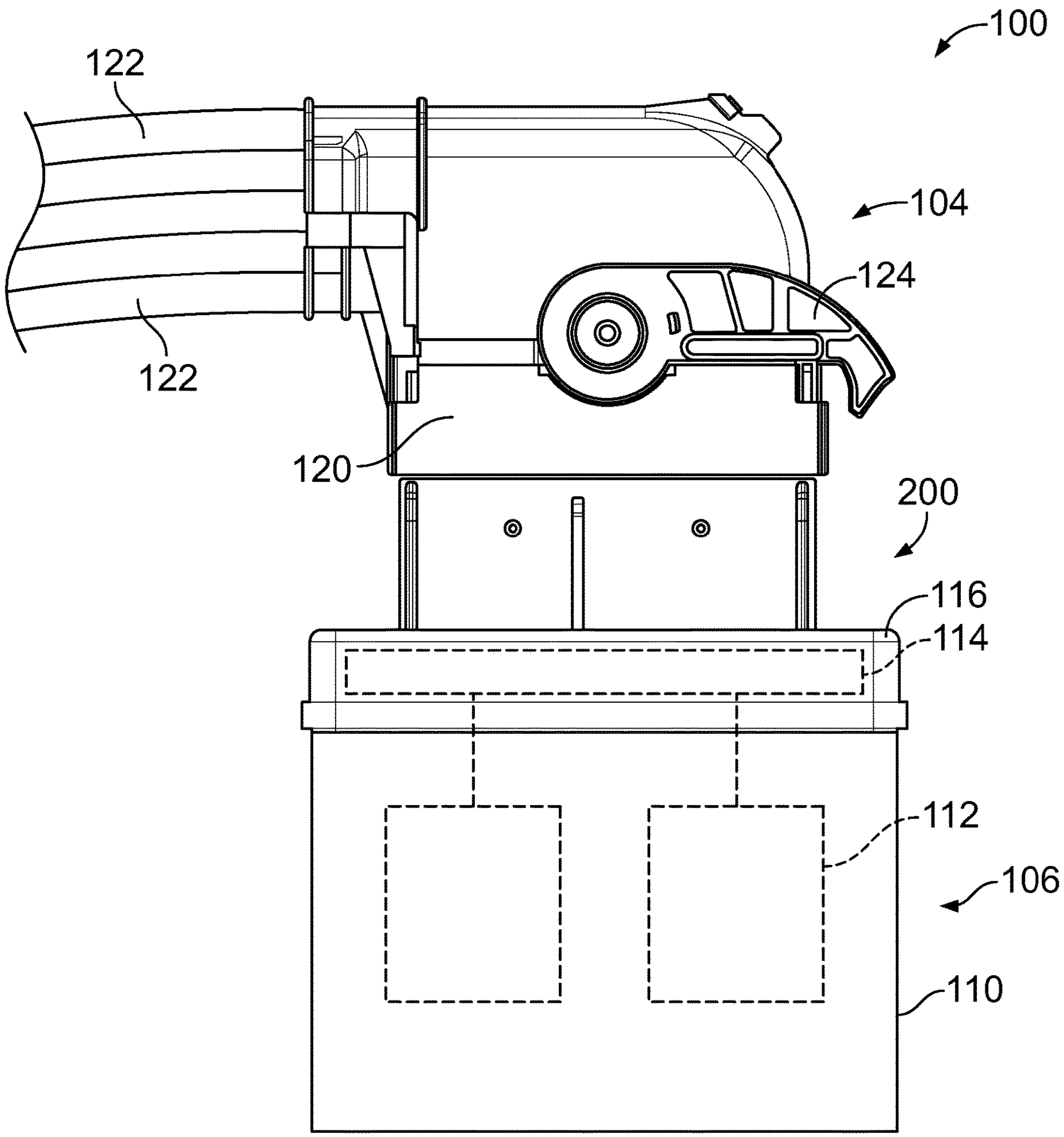
FIG. 1 is a side view of an electrical connector system in accordance with an exemplary embodiment.
Figure 2:
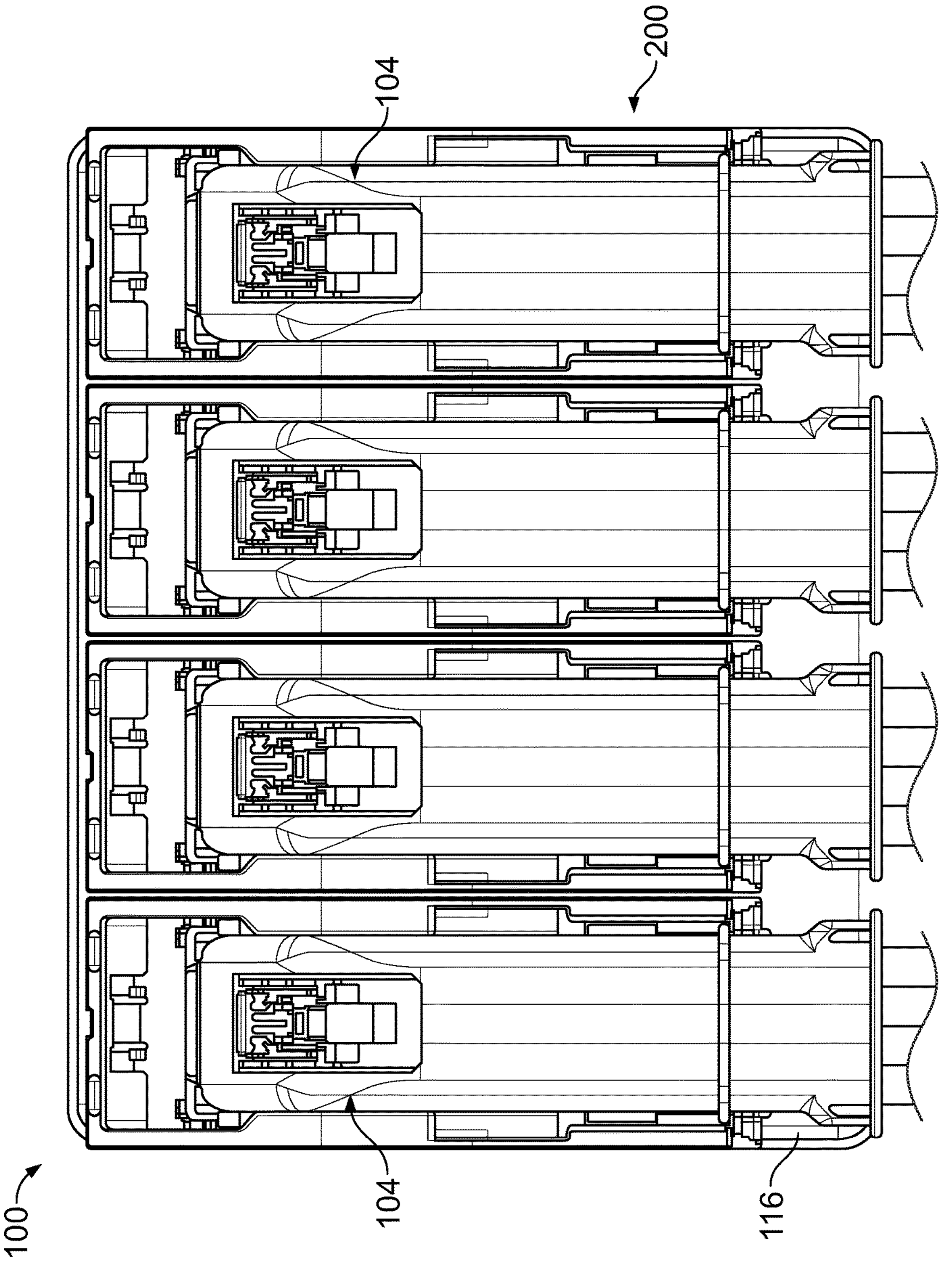
FIG. 2 is an end view of the electrical connector system in accordance with an exemplary embodiment.

FIG. 1 is a side view of an electrical connector system 100 in accordance with an exemplary embodiment. FIG. 2 is an end view of the electrical connector system 100 in accordance with an exemplary embodiment. The electrical connector system 100 includes an electrical connector assembly 200 used to electrically connect one or more harness connectors 104 with a control module 106, such as a control module or electrical center of a vehicle.

The electrical connector assembly 200 may be used to transmit power and/or data between the harness connectors 104 and the control module 106. In an exemplary embodiment, the electrical connector assembly 200 has a common mating interface with the control module 106. The electrical connector assembly 200 is configured to receive different types of harness connectors 104 having different mating interfaces. The electrical connector assembly 200 transitions from the various mating interfaces of the harness connectors 104 to the common mating interface with the control module 106.

In an exemplary embodiment, the control module 106 includes a module housing 110 holding a controller 112 (shown in phantom in FIG. 1) and a control circuit board 114 (shown in phantom in FIG. 1). The control module 106 includes circuitry and/or wiring to electrically connect the controller 112 to the control circuit board 114. The controller 112 and/or the control circuit board 114 may be connected to other devices within the vehicle by circuitry and/or wiring. In an exemplary embodiment, a cover 116 is coupled to the module housing 110 to close out the control module 106. The electrical connector assembly 200 may be coupled to the cover 116 to electrically connect to the control circuit board 114. The harness connector 104 may be coupled to the cover 116 to electrically connect to the electrical connector assembly 200.

The harness connector 104 includes a harness housing 120 holding harness contacts (not shown). Harness wires 122 extend into the harness housing 120 and are terminated to the harness contacts. The harness wires 122 are routed to other components within the vehicle. In an exemplary embodiment, the harness connector 104 includes a lever 124 for mating the harness connector 104 to the cover 116. The lever 124 interfaces with a slide or actuator, such as a cam actuator, to mate the harness connector 104 to the cover 116.

Figure 3:
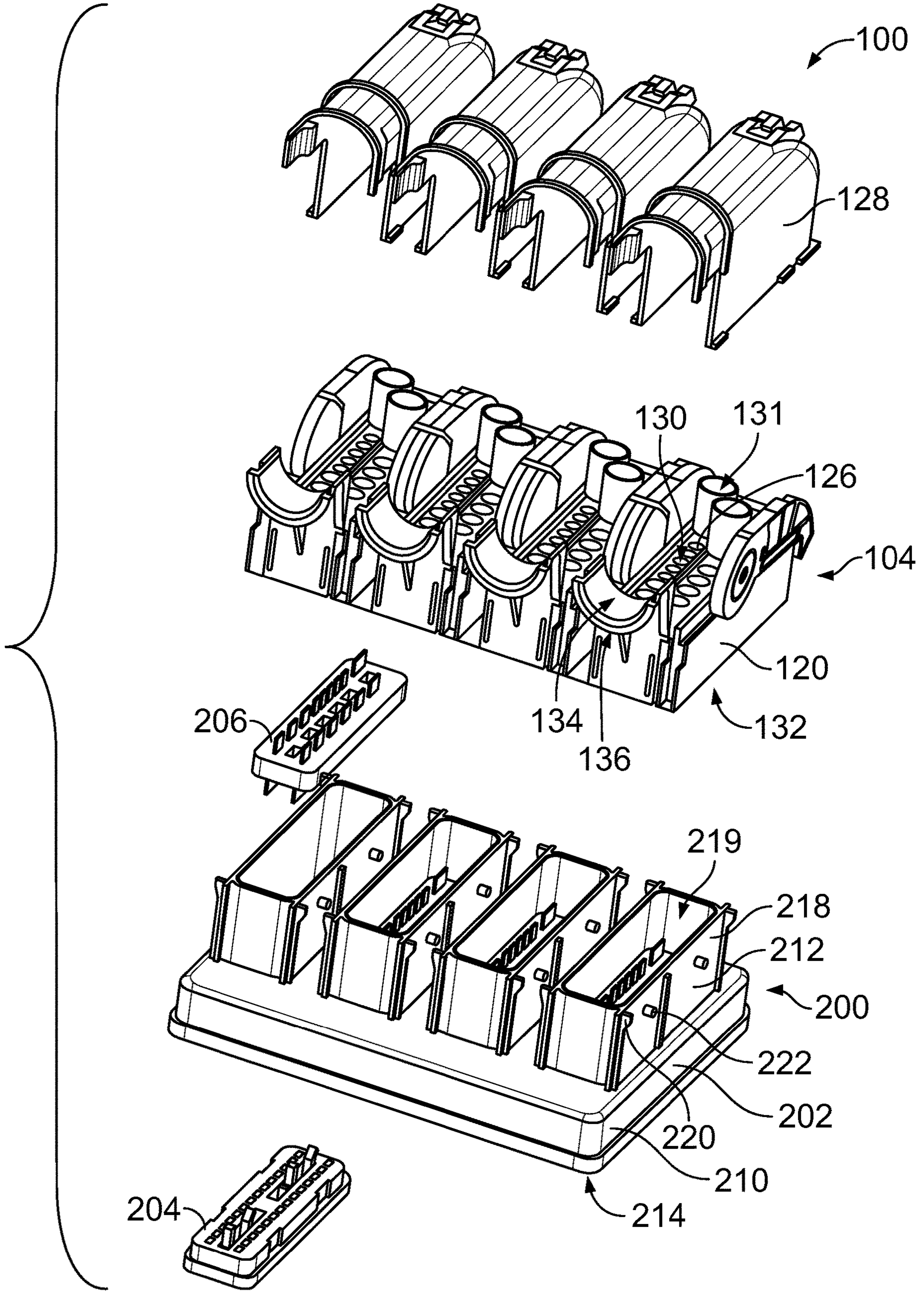
FIG. 3 is an exploded view of a portion of the electrical connector system in accordance with an exemplary embodiment.

FIG. 3 is an exploded view of a portion of the electrical connector system 100 in accordance with an exemplary embodiment. In the illustrated embodiment, the electrical connector assembly 200 is configured to be mated with four of the harness connectors 104. However, the electrical connector assembly 200 may be sized to mate with greater or fewer harness connectors 104 in alternative embodiments.

The electrical connector assembly 200 includes an outer housing 202 that holds one or more board connectors 204 and one or more bridge connectors 206. In the illustrated embodiment, the electrical connector assembly 200 holds four of the board connectors 204 and four of the bridge connectors 206. However, the electrical connector assembly 200 may hold greater or fewer number of board connectors 204 and bridge connectors 206. The number of board connectors 204 and bridge connectors 206 corresponds to the number of harness connectors 104. Each set of board connector 204 and bridge connector 206 is configured to mate with a corresponding harness connector 104.

In an exemplary embodiment, the outer housing 202 forms the cover 116 (shown in FIGS. 1 and 2) for the control module 106. Alternatively, the outer housing 202 may be coupled to the cover 116 or another portion of the module housing 110 (shown in FIGS. 1 and 2). The outer housing 202 includes a base 210 and one or more shrouds 212 extending from the base 210. The harness connectors 104 are coupled to the corresponding shrouds 212. In the illustrated embodiment, the outer housing 202 includes four of the shrouds 212. The base 210 forms an inner chamber 214, such as at the bottom of the base 210. In an exemplary embodiment, the inner chamber 214 is sized and shaped to receive the control circuit board 114 (shown in FIG. 1). Each shroud 212 forms a shroud chamber 216 open to the inner chamber 214. The shroud chamber 216 receives the corresponding board connector 204 and the corresponding bridge connector 206. The shroud chamber 216 is configured to receive a portion of the corresponding harness connector 104.

In an exemplary embodiment, the shroud 212 includes shroud walls 218 surrounding the shroud chamber 216. In the illustrated embodiment, the shrouds 212 are generally rectangular shaped defined by four of the shroud walls 218 extending along opposite sides and opposite ends of the shroud 212. Optionally, the corners of the shroud 212 may be rounded or curved. In an exemplary embodiment, guide features 220 extend from the shroud walls 218 to guide mating of the harness connector 104 with the shroud 212. The guide features 220 may be protrusions or tabs extending from the exterior of the shroud walls 218. Other types of guide features may be used in alternative embodiments. In an exemplary embodiment, securing features 222 extend from the shroud walls 218 to couple the harness connector 104 to the shroud 212. The securing features 222 may be pins, posts, tabs, latches, clips, slots, openings, or other types of securing features.

The harness connector 104 includes the harness housing 120, a contact holder 126 received in the harness housing 120, and a cover 128 configured to be coupled to the harness housing 120 to cover the contact holder 126 and the harness wires 122 (shown in FIG. 1). The contact holder 126 holds a plurality of harness contacts 130. In an exemplary embodiment, the contact holder 126 includes contact channels 131 that receive the harness contacts 130 and may receive the ends of the harness wires 122. The harness contacts 130 are configured to be terminated to the harness wires 122, such as by crimp connections, soldering, or other type of connection. The harness contacts 130 may have pins, sockets, blades, receptacles, spring beams, tuning forks, or other types of mating ends for mating with the electrical connector assembly 200.

In an exemplary embodiment, the harness connector 104 includes various size harness contacts 130, which may be configured to convey different current amounts. For example, the harness contacts 130 may be sized to have different current carrying capacities. In various embodiments, the harness contacts 130 may include small harness contacts, medium harness contacts, and large harness contacts each having different current carrying capacities, such as approximately 20 A, 30 A, and 40 A, respectively. Other sized harness contacts may be used in alternative embodiments, such as an extra-large contact having a 60 A current carrying capacity or a mini contact having a 10 A current carrying capacity. Different sized harness wires 122 are connected to the different sized harness contacts 130. In an exemplary embodiment, the different harness connectors 104 may have a different arrangement of the harness contacts 130, such as a different number of each of the different sized harness contacts and/or a different arrangement of the different sized harness contacts.

The harness contacts 130 extend to a mating end 132 of the harness connector 104. The mating end 132 is configured to be mated with the electrical connector assembly 200. In an exemplary embodiment, the harness housing 120 and the cover 128 form a wire exit 134 at a wire exit end 136 of the harness connector 104. In the illustrated embodiment, the wire exit end 136 is oriented perpendicular to the mating end 132. The harness wires 122 are configured to transition from the harness contacts 130 to the wire exit 134, such as through a 90° bend.

Figure 4:
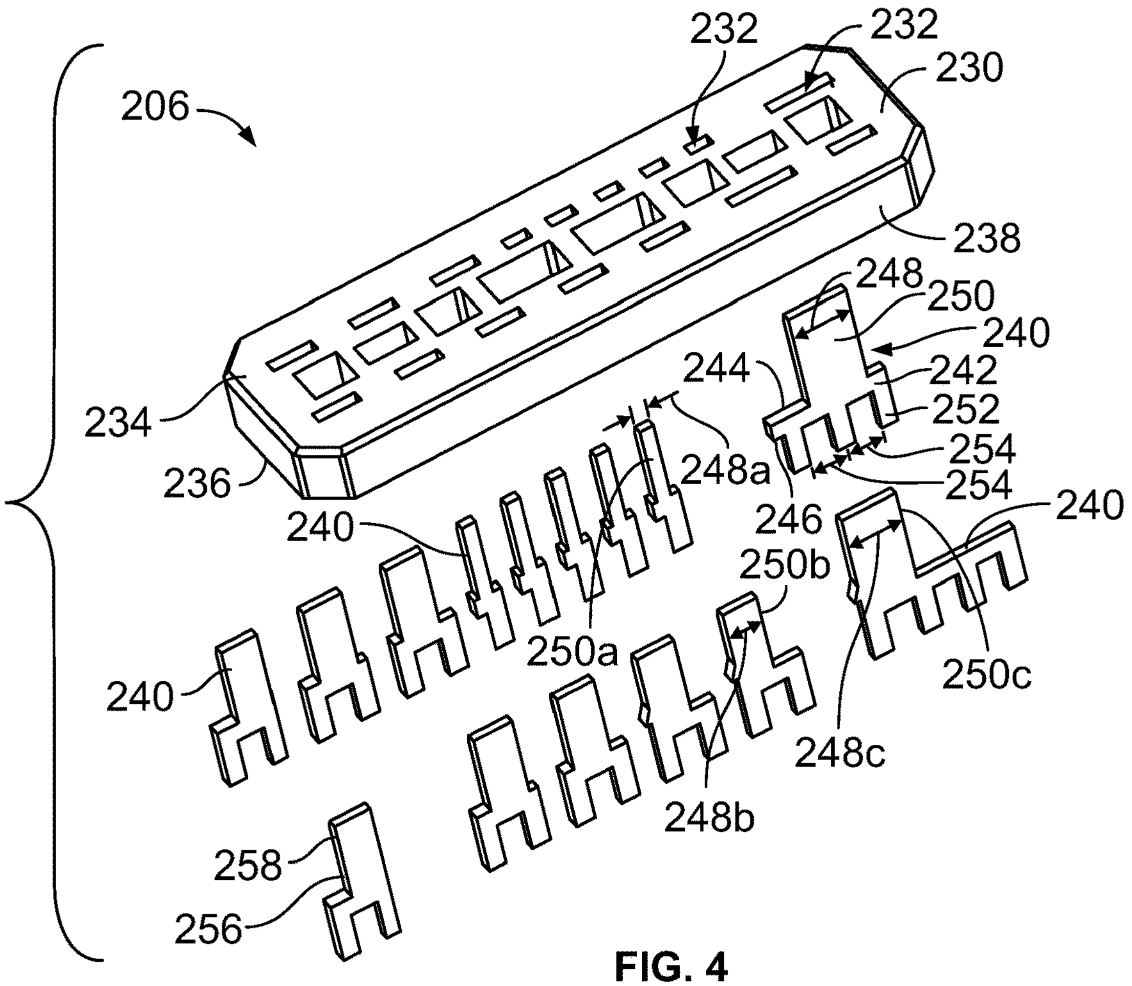
FIG. 4 is an exploded view of the bridge connector in accordance with an exemplary embodiment.
Figure 5:
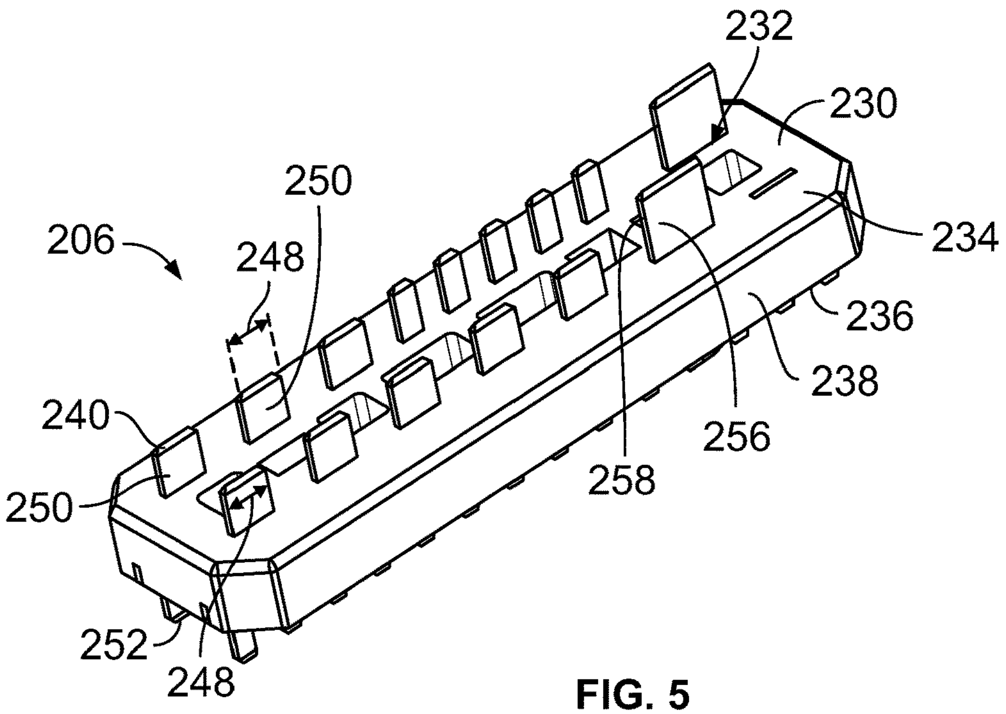
FIG. 5 is an assembled view of the bridge connector in accordance with an exemplary embodiment.

FIG. 4 is an exploded view of the bridge connector 206 in accordance with an exemplary embodiment. FIG. 5 is an assembled view of the bridge connector 206 in accordance with an exemplary embodiment. The bridge connector 206 includes a bridge holder 230 and a plurality of bridge terminals 240. The bridge holder 230 holds the bridge terminals 240 relative to each other. The bridge terminals 240 are configured to be coupled to corresponding harness contacts 130 (shown in FIG. 3) and configured to be coupled to corresponding board contacts of the board connector 204 (shown in FIG. 3).

The bridge holder 230 includes terminal channels 232 extending therethrough that receive corresponding bridge terminals 240. The bridge holder 230 is manufactured from a dielectric material, such as a plastic material. In various embodiments, the bridge holder 230 may be an injection molded part. The bridge holder 230 extends between an upper surface 234 and a lower surface 236. The bridge holder 230 has an outer edge 238 between the upper surface 234 and the lower surface 236. In various embodiments, the upper surface 234 is planar and parallel to the lower surface 236, which may also be planar. The bridge holder 230 is sized and shaped to fit in the corresponding shroud chamber 216 (shown in FIG. 3). The bridge holder 230 may include securing features to secure the bridge holder 230 to the shroud 212. Optionally, the bridge holder 230 may fit in the shroud 212 by an interference fit.

Each bridge terminal 240 includes a main body 242 having a top 244 and a bottom 246. The bridge terminal 240 includes a harness mating pin 250 extending from the top 244 configured to be mated with the corresponding harness contact 130. The bridge terminal 240 includes one or more board mating pins 252 extending from the bottom 246 configured to be mated with the corresponding board contacts of the board connector 204.

In an exemplary embodiment, the harness mating pins 250 of different bridge terminals 240 may have different sizes, which may be configured to convey different current amounts. For example, the harness mating pins 250 have different widths 248. The harness mating pins 250 are sized to have different current carrying capacities. In various embodiments, the harness mating pins 250 may include small harness mating pins 250*a*, medium harness mating pins 250*b*, and large harness mating pins 250*c* each having different current carrying capacities, such as approximately 20 A, 30 A, and 40 A, respectively. Other sized harness mating pins may be used in alternative embodiments, such as an extra-large harness mating pin having a 60 amp current carrying capacity or a mini contact having a 10 A current carrying capacity. In various embodiments, the width 248*a* of the small harness mating pin 250*a* is X, the width 248*b* of the medium harness mating pin 250*b* is approximately 2X, and the width 248*c* of the large harness mating pin 250*c* is approximately 3X. In an exemplary embodiment, the width 248*a* of the small harness mating pin 250*a* is approximately 2.8 mm, the width 248*b* of the medium harness mating pin 250*b* is approximately 6.3 mm, and the width 248*c* of the large harness mating pin 250*c* is approximately 9.5 mm. The different size harness mating pins 250 correspond to the different sized harness contacts 130. For example, the locations and current ratings for the harness mating pins 250 correspond with the locations and current ratings for the harness contacts 130. The layout of the bridge terminals 240 may be different on different bridge connectors 206 to accommodate the different types of harness connectors 104.

In an exemplary embodiment, all of the board mating pins 252 are of a common size. For example, all of the board mating pins 252 across the various bridge terminals 240 may be identical. Each of the board mating pins 252 may have the same height, width, and thickness. Optionally, the widths of the board mating pins 252 may be approximately equal to the width of the small harness mating pin 250*a* such that the current carrying capacity along each board mating pin 252 is approximately equal to the current carrying capacity of the small harness mating pin 250*a*. In an exemplary embodiment, the width of the board mating pin is approximately 2.8 mm.

In an exemplary embodiment, different numbers of board mating pins 252 are provided to change the current carrying capacity of the bridge terminal 240. For example, the bridge terminals 240 include a greater number of board mating pins 252 to have a higher current carrying capacity and the bridge terminals 240 include a lesser number board mating pins 252 to have a lower current carrying capacity. Some bridge terminals 240 may have a single board mating pin 252. Other bridge terminals 240 may have two, three, four or more board mating pins 252 to increase the current carrying capacity. The number of board mating pins 252 for each bridge terminal 240 corresponds to the size (for example, width 248) of the harness mating pin 250 of the corresponding bridge terminal 240. In various embodiments, the single board mating pin 252 may correspond to a bridge terminal having approximately 20 amp current carrying capacity, the dual board mating pins 252 may correspond to a bridge terminal having approximately 30 amp current carrying capacity, the triple board mating pins 252 may correspond to a bridge terminal having approximately 40 amp current carrying capacity, the quad board mating pins 252 may correspond to a bridge terminal having approximately 60 amp current carrying capacity, and the like. The board mating pins 252 may have different configurations (for example, at different locations) on different bridge terminals 240.

In an exemplary embodiment, the board mating pins 252 have a predetermined pitch 254 therebetween. In an exemplary embodiment, the pitch 254 may be approximately 5.0 mm. Optionally, the bridge terminals 240 may be located in the bridge holder 230 such that the board mating pins 252 of adjacent bridge terminals 240 maintain the predetermined pitch. Optionally, the bridge terminals 240 may be located in the bridge holder 230 such that gaps are provided between adjacent bridge terminals 240; however, the spacing is controlled such that the board mating pins 252 are located on the correct edge with one or more gaps in the pitch between the adjacent bridge terminals 240. In various embodiments, the board mating pins 252 may be offset relative to the harness mating pins 250 to maintain the predetermined pitch 254. For example, the board mating pins 252 and/or the harness mating pin 250 may be shifted to the right or the left along the main body 242 such that the board mating pins 252 and/or the harness mating pin 250 are not centered along the main body 242.

In an exemplary embodiment, the bridge terminal 240 is a stamped terminal. For example, the bridge terminal 240 may be stamped from a metal sheet or blank of material. The bridge terminal 240 includes a first side 256 and a second side 258. The first and second sides 256, 258 are planar. In an exemplary embodiment, the main body 242 is co-planer with the harness mating pin 250 and co-planer with the board mating pins 252. However, in alternative embodiments, the bridge terminal 240 may be non-planar, such as having board mating pins 252 off-set from the harness mating pin 250, such as to a first side and/or a second side of the harness mating pin 250. For example, the bridge terminal 240 may be Y-shaped having two rows of the board mating pins 252 to increase the number of connections with the board connector, and thus increase the current carrying capacity.

Figure 6:
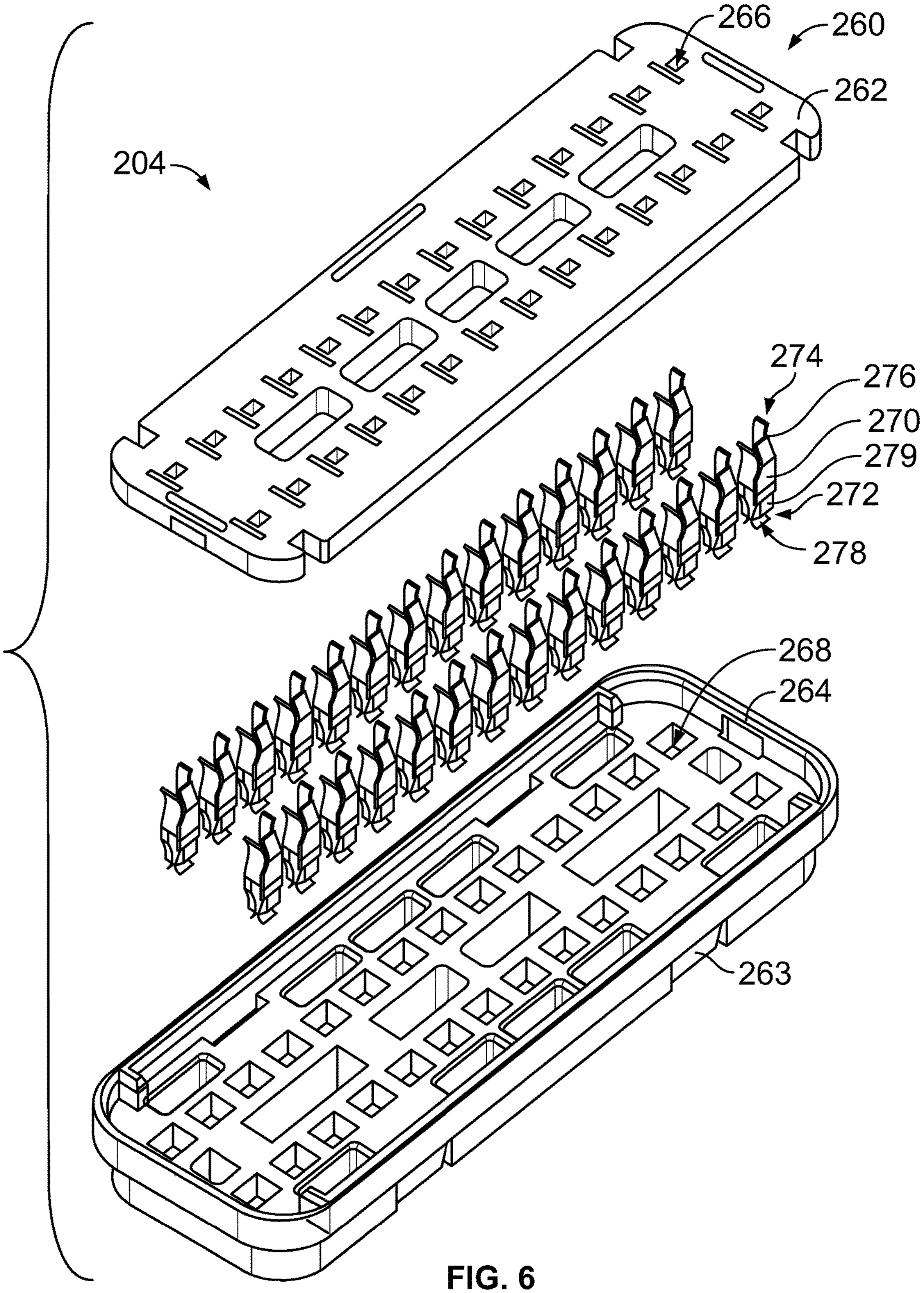
FIG. 6 is an exploded view of the board connector in accordance with an exemplary embodiment.
Figure 7:
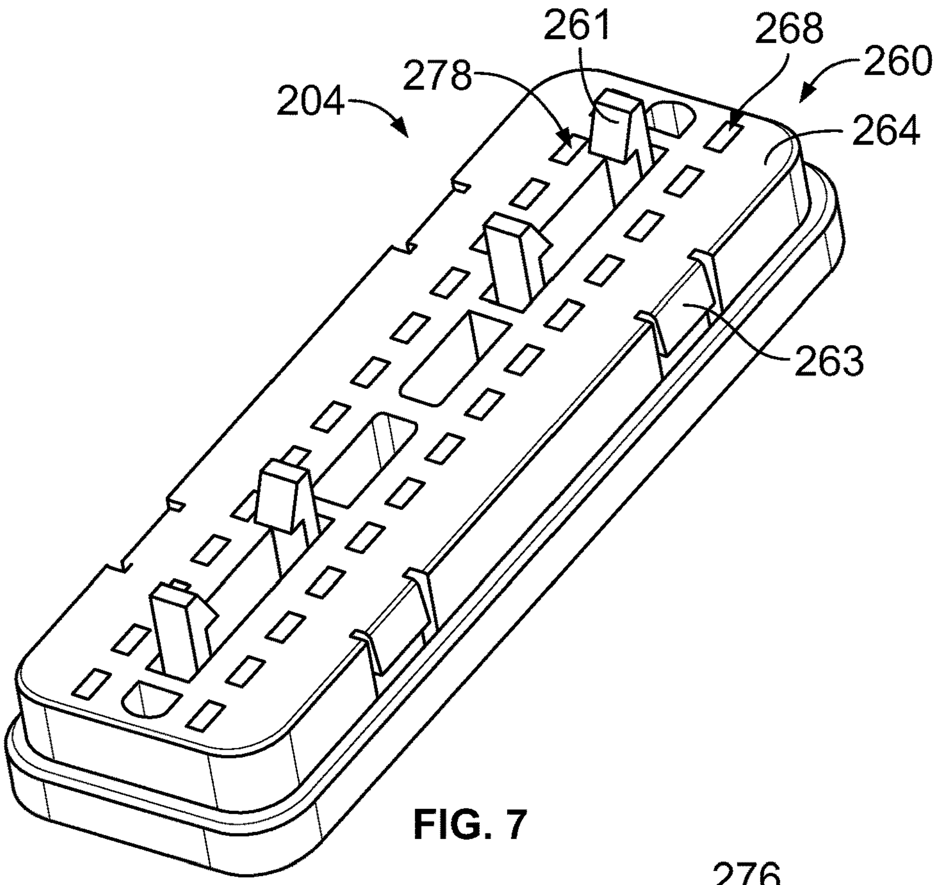
FIG. 7 is a top perspective view of the board connector in accordance with an exemplary embodiment.
Figure 8:
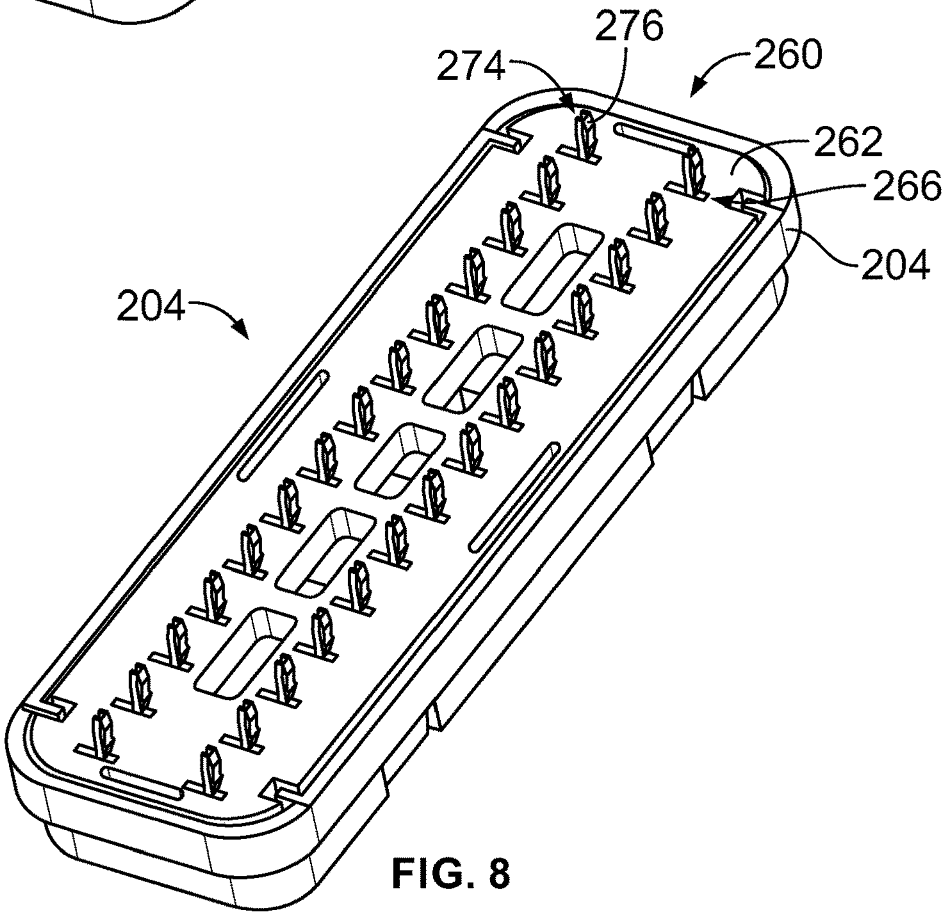
FIG. 8 is a bottom perspective view of the board connector in accordance with an exemplary embodiment.

FIG. 6 is an exploded, bottom perspective view of the board connector 204 in accordance with an exemplary embodiment. FIG. 7 is a top perspective view of the board connector 204 in accordance with an exemplary embodiment. FIG. 8 is a bottom perspective view of the board connector 204 in accordance with an exemplary embodiment.

The board connector 204 includes a board connector housing 260 and a plurality of board contacts 270 held in the board connector housing 260. In the illustrated embodiment, the board connector housing 260 is a multi-piece housing having a base 262 and a cover 264 covering the base 262. The base 262 includes a plurality of base pockets 266 that receive and hold the board contacts 270. The cover 264 includes a plurality of cover openings 268 aligned with the base pockets 266. The cover openings 268 provide access to the base pockets 266 and the board contacts 270. Portions of the board contacts 270 may extend into the cover openings 268. The board connector housing 260 may be a single-piece housing in alternative embodiments.

In an exemplary embodiment, the board connector housing 260 includes a plurality of latches 261 used to secure the bridge holder 230 to the board connector housing 260. In the illustrated embodiment, the latches 261 extend from a top of the cover 264. Other types of securing features may be used in alternative embodiments.

In an exemplary embodiment, the board connector housing 260 includes a plurality of securing features 263 used to secure the board connector housing 260 to the outer housing 202 (shown in FIG. 3). In the illustrated embodiment, the securing features 263 are deflectable latches. The securing features 263 are configured to be coupled to the shroud walls 218 of the shroud 212 to hold the board connector 204 in the shroud chamber 216. Other types of securing features may be used in alternative embodiments.

In an exemplary embodiment, each board contact 270 is identical. Each board contact 270 extends between a mating end 272 and a terminating end 274. In the illustrated embodiment, the board contact 270 includes a solder tail 276 at the terminating end 274. The solder tail 276 is configured to be soldered to the control circuit board 114 (shown in FIG. 1). Other types of terminating ends may be provided in alternative embodiments, such as compliant pins configured to be press-fit into the control circuit board 114. In the illustrated embodiment, the board contact 270 includes a receptacle 278 at the mating end 272. The receptacle 278 is configured to receive the board mating pin 252 of the bridge terminal 240 (shown in FIG. 4). In various embodiments, the receptacle 278 includes spring fingers 279 configured to engage the opposite sides of the board mating pin 252. The spring fingers 279 are configured to be spring biased against the opposite sides of the board mating pin 252 for electrical connection between the board contact 270 and the bridge terminal 240. Other types of mating ends may be provided in alternative embodiments, such as pins, sockets, tuning fork contacts, spring beams, blades, and the like.

In an exemplary embodiment, the board connector 204 includes an array of the board contacts 270 arranged in rows and columns. The board contacts 270 may be held at predetermined positions by the board connector housing 260. In an exemplary embodiment, the board contacts 270 are arranged at a predetermined pitch within each of the rows. For example, the board contacts 270 has a uniform spacing between the each of the board contacts 270 within the row. The spacing corresponds to the pitch 254 of the board mating pins 252. In an exemplary embodiment, each and every base pocket 266 and cover opening 268 receives one of the board contacts 270. However, some of the board contacts 270 may be unused, depending on the particular arrangement of bridge terminals 240. For example, when gaps are provided between some of the board mating pins 252, the board contacts 270 at those gaps are used and to not receive any board mating pin 252. Each of the board contacts 270 that is mated with the corresponding board mating pin 252 electrically connects such board mating pin 252 with the control circuit board 114. However, in alternative embodiments, some of the base pockets 266/cover openings 268 may be left open rather than having the board contact 270.

The board connector 204 provide a uniform mating interface for mating with the bridge connector 206. The board connector 204 is configured to receive different bridge connectors 206 having different arrangements of the bridge terminals 240. The particular arrangement of the board mating pins 252 of the bridge connector 206 is irrelevant as the board connector 204 is able to accommodate any arrangement of the board mating pins 252. For example, the board connector 204 may include a total of twenty-eight board contacts 270 arranged in two rows, which may accommodate a bridge connector 206 having any number of board mating pins 252 up to twenty-eight board mating pins. The overpopulated board connector 204 is thus able to accommodate various types of bridge connectors 206, which correspond with the various types of harness connectors 104. The bridge connectors 206 transition between the board connector 204 and the harness connector 104. The bridge connectors 206 transition from a nonuniform mating interface (for mating with various harness connectors 104) to a uniform mating interface (for mating with the uniform board connectors 204).

Figure 9:
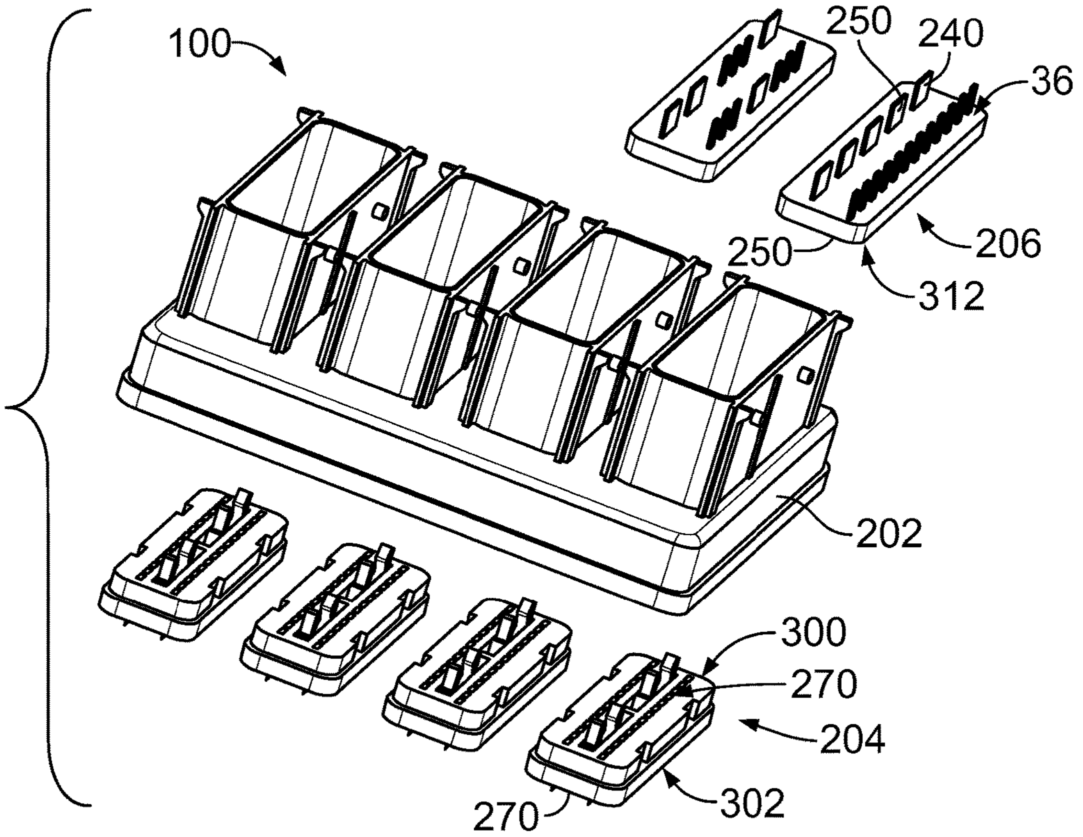
FIG. 9 is an exploded view of a portion of the electrical connector system in accordance with an exemplary embodiment.
Figure 10:
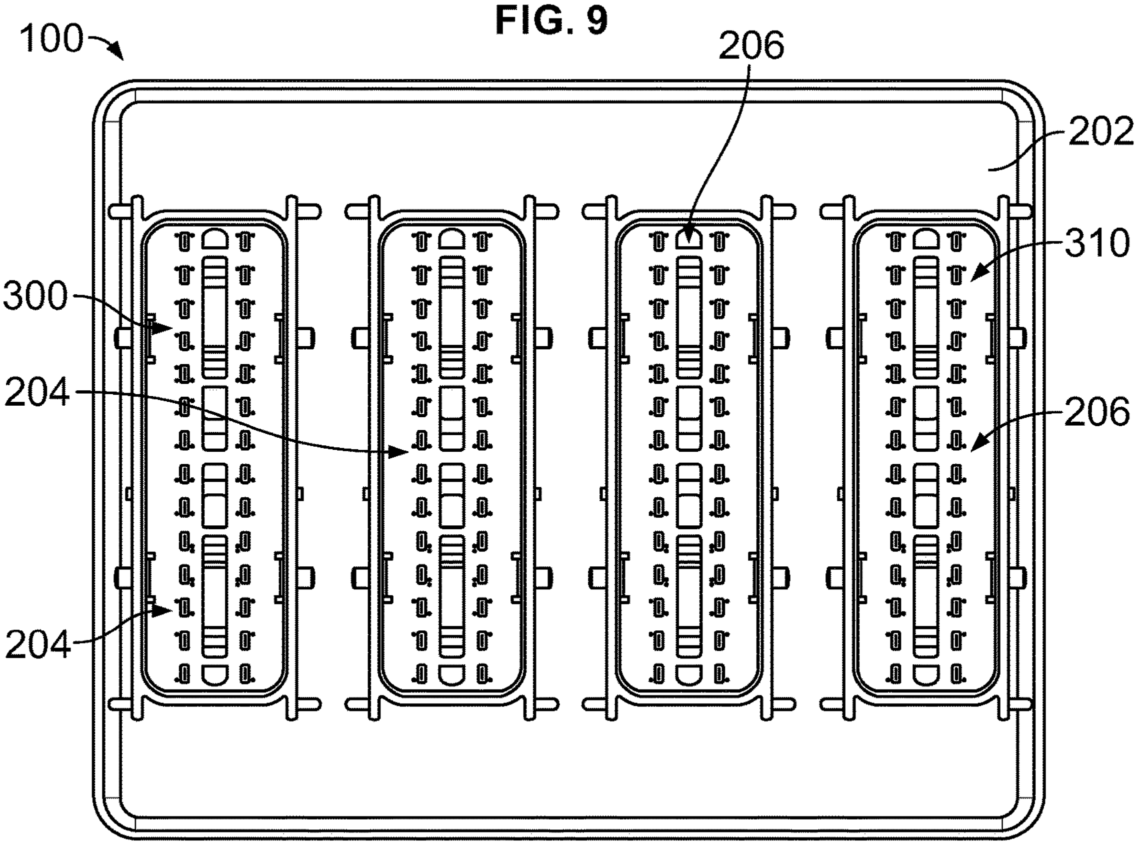
FIG. 10 is a top view of a portion of the electrical connector system in accordance with an exemplary embodiment.

FIG. 9 is an exploded view of a portion of the electrical connector system 100 in accordance with an exemplary embodiment. FIG. 10 is a top view of a portion of the electrical connector system 100 in accordance with an exemplary embodiment. FIGS. 9 and 10 illustrate the outer housing 202, a plurality of the board connectors 204 (four board connectors 204 shown), and a plurality of the bridge connectors 206 (only two bridge connectors 206 shown but other bridge connectors could be used).

In an exemplary embodiment, each of the board connectors 204 are identical. The board connectors have an upper board connector interface 300 and a lower board connector interface 302. The upper board connector interface 300 is defined by the mating ends of the board contacts 270 (for example, the locations, spacing, type of contact, and the like). The lower board connector interface 302 is defined by the terminating ends of the board contacts 270 (for example, the locations, spacing, type of contact, and the like). In an exemplary embodiment, the board connectors 204 all have the same upper board connector interface 300 and the same lower board connector interface 302. As such, the board connectors 204 are interchangeable within the electrical connector system 100 and can be mated to any mating location on the control circuit board.

In an exemplary embodiment, the bridge connectors 206 may be different than each other. For example, the bridge connectors 206 are different to mate with harness connectors 104 that have different mating interfaces. The bridge connectors 206 each have an upper bridge connector interface 310 and a lower bridge connector interface 312. The upper bridge connector interface 310 is defined by the harness mating pins 250 of the bridge terminals 240 (for example, the locations, spacing, width, and the like). The lower bridge connector interface 312 is defined by the board mating pins 252 of the bridge terminals 240 (for example, the locations, spacing, width, and the like). In an exemplary embodiment, the upper bridge connector interfaces 310 are different from each other for mating with different types of header connectors 104. In an exemplary embodiment, the lower bridge connector interfaces 312 are different from each other. However, the board mating pins 252 have a pin out configured to mate with the board connectors 204, which are identical. As such, the bridge connectors 206 are interchangeable with the various board connectors 204. The bridge connectors 206 transition between the harness connectors 104 and the board connectors 204.

Figure 11:
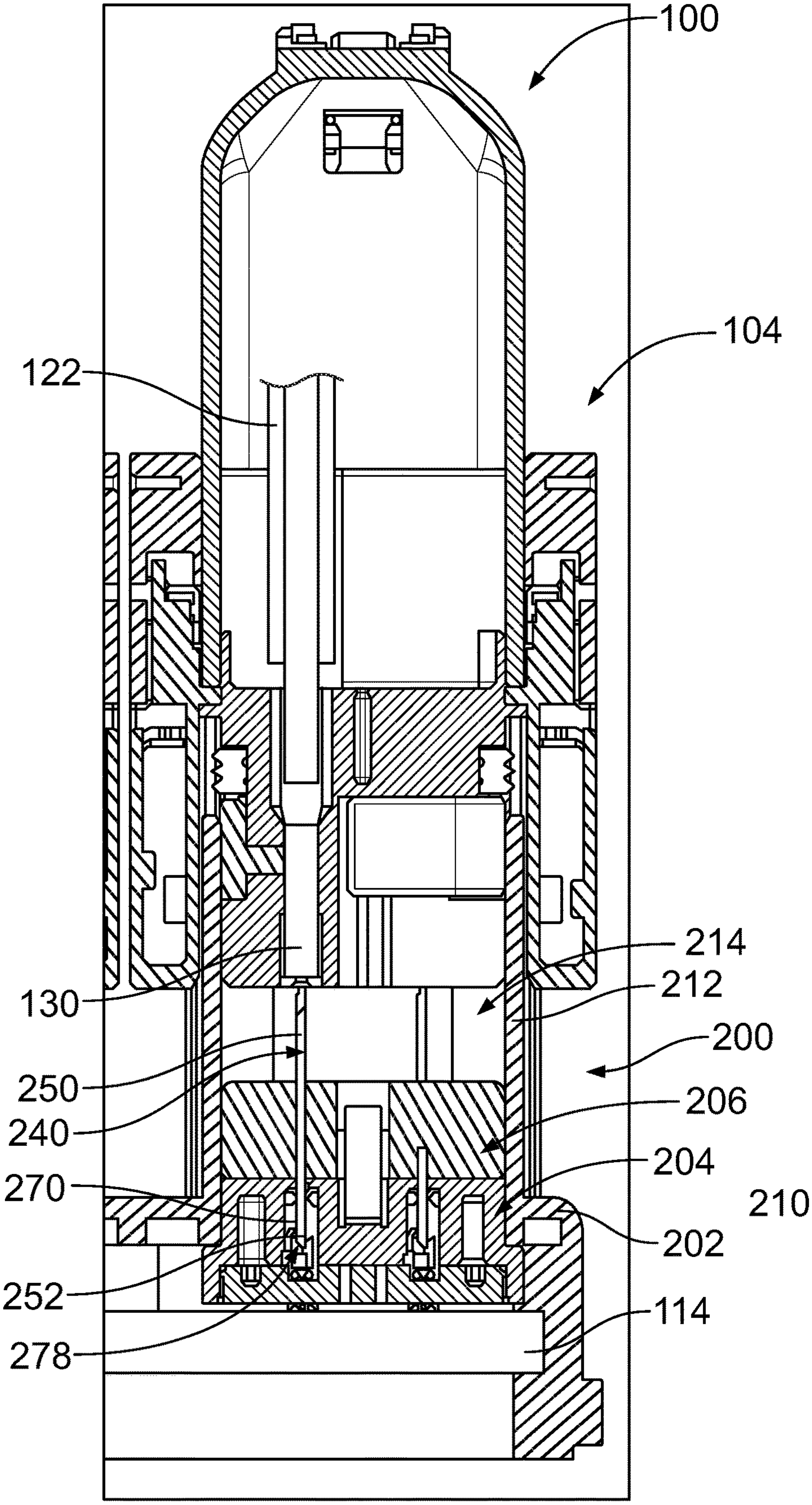
FIG. 11 is a cross-sectional view of a portion of the electrical connector system in accordance with an exemplary embodiment showing the harness connector coupled to the electrical connector assembly.

FIG. 11 is a cross-sectional view of a portion of the electrical connector system 100 in accordance with an exemplary embodiment showing the harness connector 104 coupled to the electrical connector assembly 200. The harness connector 104 is coupled to the shroud 212 of the outer housing 202. The control circuit board 114 is located in the inner chamber 214 at the base 210 of the outer housing 202. The board connector 204 is mounted directly to the control circuit board 114. The board contacts 270 are electrically connected to the control circuit board 114. The bridge connector 206 is coupled to the board connector 204. The bridge contacts 240 are electrically connected with the board contacts 270. For example, the board mating pins 252 are received in the receptacles 278. The harness mating pins 250, opposite the board mating pins 252, are electrically connected to corresponding harness contacts 130 of the harness connector 104. The harness contacts 130 are electrically connected to corresponding harness wires 122 within the harness connector 104.

The board connector 204 provides a uniform mating interface with the control circuit board 114. The board connector 204 has a uniform mating interface with the bridge connector 206. The bridge connector 206 transitions from the uniform mating interface two the particular mating interface required for the harness connector 104 using the different size bridge terminals 240 at particular locations. The board mating pins 252 of the bridge terminals 240 are configured to be mated with the uniform mating interface of the board connector 204. The harness mating pins 250 of the bridge terminals 240 have different widths and sizes corresponding to the different sizes of the harness contacts 130. The bridge connectors 206 transition between the board connector 204 and the harness connector 104. The bridge connectors 206 transition from a nonuniform mating interface (for mating with various harness connectors 104) to a uniform mating interface (for mating with the uniform board connectors 204).

An electrical connection system is provided having an intermediate (between harness connector and board connector) bridge connector which will take the harness connector mating pinout to a common board connector pinout. For example, the bridge connector converts various contact sizes (for example, 2.8 mm, 6.3 mm, 9.5 mm, 12.0 mm) and bridges to all a common size (for example, 1.2 mm or 1.5 mm or 2.8 mm) in an electrical center/control module. The harness connector could have all a common size (for example, 6.3 mm) that is different than the common size of the board connector (for example, 2.8 mm) by bridging from the first size to the second size through the bridge connector. The harness connector could have all the same size contacts as the board connector (for example, 2.8 mm) in other embodiments.

The intermediate bridge connector includes the holder and individual bridge terminals which bridge or transition from the harness interface to the board interface. The bridge terminals are assembled to the holder by a stitching method as one method of assembly. The holder connector may have various arrangements of the bridge terminals to accommodate differing harness connector interfaces.

The board connector incudes a plastic housing with chambers to contain contacts with receptacles at mating ends for mating with the mating pins of the bridge terminals. The board contacts are also terminated to the control circuit board of the control module at a standardized/common interface. The board connector maintains the true position and common pitch/spacing of the board contacts, such as for connection to the control circuit board.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector assembly comprising:

a board connector configured to be coupled to a control circuit board of a control module, the board connector including a board connector housing holding a plurality of board contacts, each board contact including a mating end and a terminating end, the terminating end configured to be coupled to the control circuit board, the mating end including a receptacle; and a bridge connector coupled to the board connector, the bridge connector configured to be coupled to a harness connector, the bridge connector including a bridge holder including terminal channels, the bridge connector including bridge terminals received in corresponding terminal channels, each bridge terminal including a harness mating pin and at least one board mating pin opposite the harness mating pin, the board mating pins of the bridge terminals being received in receptacles of the corresponding board contacts, wherein all of the board mating pins in the bridge connector are of a common size, and wherein at least two of the harness mating pins in the bridge connector are of different sizes.

2. The electrical connector assembly of claim 1, wherein all of the board contacts are identical.

3. The electrical connector assembly of claim 1, wherein the number of board mating pins per bridge terminal corresponds to the size of the harness mating pin of the corresponding bridge terminal.

4. The electrical connector assembly of claim 1, wherein the bridge terminals include a first bridge terminal and a second bridge terminal, the first bridge terminal including a single harness mating pin and a single board mating pin, the second bridge terminal including a single harness mating pin and a pair of the board mating pins.

5. The electrical connector assembly of claim 4, wherein the bridge terminals include a third bridge terminal, the third bridge terminal including a single harness mating pin and three of the board mating pins.

6. The electrical connector assembly of claim 4, wherein the second bridge terminal is configured to convey higher current than the first bridge terminal.

7. The electrical connector assembly of claim 4, wherein the first bridge terminal is electrically connected to a single board contact and the second bridge terminal is electrically connected to two of the board contacts.

8. The electrical connector assembly of claim 4, wherein the harness mating pin of the first bridge terminal has a first width and the harness mating pin of the second bridge terminal has a second width greater than the first width.

9. The electrical connector assembly of claim 1, wherein the bridge terminal is a stamped terminal.

10. The electrical connector assembly of claim 1, wherein the bridge terminal is planar having a first side and a second side, the harness mating pin being coplanar with the at least one board mating pins.

11. The electrical connector assembly of claim 1, wherein the bridge connector includes M number of bridge terminals and the board connector includes N number of board contacts greater than the M number of bridge terminals.

12. An electrical connector assembly comprising:

a first board connector configured to be coupled to a control circuit board of a control module, the first board connector including a first board connector housing holding a plurality of first board contacts, each first board contact including a first mating end and a first terminating end, the first terminating end configured to be coupled to the control circuit board, the first mating end including a first receptacle, wherein the first board connector has a first upper board connector interface defined by the first mating ends and a first lower board connector interface defined by the first terminating ends;

a second board connector configured to be coupled to the control circuit board of the control module, the second board connector including a second board connector housing holding a plurality of second board contacts, each second board contact including a second mating end and a second terminating end, the second terminating end configured to be coupled to the control circuit board, the second mating end including a second receptacle, wherein the second board connector has a second upper board connector interface defined by the second mating ends identical to the first upper board connector interface and a second lower board connector interface defined by the second terminating ends identical to the first lower board connector interface;

a first bridge connector coupled to the first board connector, the first bridge connector configured to be coupled to a first harness connector, the first bridge connector including a first bridge holder including first terminal channels, the first bridge connector including first bridge terminals received in corresponding first terminal channels, each first bridge terminal including a first harness mating pin and at least one first board mating pin opposite the first harness mating pin, the first board mating pins of the first bridge terminals being received in first receptacles of the corresponding first board contacts, wherein the first bridge connector has a first upper bridge connector interface defined by the first harness mating pins and a first lower bridge connector interface defined by the first board mating pins; and a second bridge connector coupled to the second board connector, the second bridge connector configured to be coupled to a second harness connector, the second bridge connector including a second bridge holder including second terminal channels, the second bridge connector including second bridge terminals received in corresponding second terminal channels, each second bridge terminal including a second harness mating pin and at least one second board mating pin opposite the second harness mating pin, the second board mating pins of the second bridge terminals being received in second receptacles of the corresponding second board contacts, wherein the second bridge connector has a second upper bridge connector interface defined by the second harness mating pins different from the first upper bridge connector interface and a second lower bridge connector interface defined by the second board mating pins different from the first lower bridge connector interface.

13. The electrical connector assembly of claim 12, wherein the second bridge connector has a different number of second harness mating pins at the second upper bridge connector interface compared to the number of first harness mating pins at the first upper bridge connector interface, and wherein the second bridge connector has a different number of second board mating pins at the second lower bridge connector interface compared to the number of first board mating pins at the first lower bridge connector interface.

14. The electrical connector assembly of claim 12, wherein all of the first board mating pins in the first bridge connector are of a common size and all of the second board mating pins in the second bridge connector are of a common size, and wherein at least two of the first harness mating pins in the first bridge connector are of different sizes and at least two of the second harness mating pins in the second bridge connector are of different sizes.

15. An electrical connector system comprising:

an outer housing including a base forming an inner chamber, the outer housing including a shroud extending from the base, the shroud forming a shroud chamber open to the inner chamber, the shroud chamber configured to receive a harness connector;

a control circuit board received in the inner chamber; and an electrical connector assembly received in the shroud chamber and coupled to the control circuit board, the electrical connector assembly configured to electrically connect the control circuit board and the harness connector, the electrical connector assembly including a board connector electrically connected to the control circuit board and a bridge connector electrically connected to the board connector, the board connector including a board connector housing holding a plurality of board contacts, each board contact including a mating end and a terminating end, the terminating end coupled to the control circuit board, the mating end including a receptacle, the bridge connector including a bridge holder including terminal channels, the bridge connector including bridge terminals received in corresponding terminal channels, each bridge terminal including a harness mating pin and at least one board mating pin opposite the harness mating pin, the harness mating pins configured to be electrically connected to the harness connector, the board mating pins of the bridge terminals being received in receptacles of the corresponding board contacts, wherein all of the board mating pins in the bridge connector are of a common size, and wherein at least two of the harness mating pins in the bridge connector are of different sizes.

16. The electrical connector system of claim 15, wherein the shroud is a first shroud, the outer housing including a second shroud, a second electrical connector assembly received in the second shroud chamber and coupled to the control circuit board, the electrical connector assembly configured to electrically connect the control circuit board with a second harness connector, the second electrical connector assembly including a second board connector electrically connected to the control circuit board and a second bridge connector electrically connected to the second board connector, the second board connector including a second board connector housing holding a plurality of second board contacts, the second bridge connector including a second bridge holder including second terminal channels, the second bridge connector including second bridge terminals received in corresponding second terminal channels, each second bridge terminal including a second harness mating pin and at least one second board mating pin opposite the second harness mating pin, the second harness mating pins configured to be electrically connected to the second harness connector, the second board mating pins of the second bridge terminals being mated with the corresponding second board contacts, wherein all of the second board mating pins in the second bridge connector are of a common size, and wherein at least two of the second harness mating pins in the second bridge connector are of different sizes.

17. The electrical connector system of claim 15, wherein all of the board contacts are identical.

18. The electrical connector system of claim 15, wherein the bridge terminals include a first bridge terminal and a second bridge terminal, the first bridge terminal including a single harness mating pin and a single board mating pin, the second bridge terminal including a single harness mating pin and a pair of the board mating pins.

19. The electrical connector system of claim 18, wherein the first bridge terminal is electrically connected to a single board contact and the second bridge terminal is electrically connected to two of the board contacts.

20. The electrical connector system of claim 18, wherein the harness mating pin of the first bridge terminal has a first width and the harness mating pin of the second bridge terminal has a second width greater than the first width, the second bridge terminal being configured to convey higher current than the first bridge terminal.

* * * * *